United States Patent
Li et al.

(10) Patent No.: US 9,949,116 B2
(45) Date of Patent: Apr. 17, 2018

(54) METHOD AND APPARATUS FOR ESTABLISHING SSID-BASED CONNECTION BETWEEN TERMINAL DEVICE AND GATEWAY DEVICE

(71) Applicant: Huawei Device Co., Ltd., Shenzhen (CN)

(72) Inventors: Lei Li, Plano, TX (US); Lei Zhao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 123 days.

(21) Appl. No.: 14/901,807

(22) PCT Filed: Aug. 5, 2014

(86) PCT No.: PCT/CN2014/083731
§ 371 (c)(1),
(2) Date: Dec. 29, 2015

(87) PCT Pub. No.: WO2015/018327
PCT Pub. Date: Feb. 12, 2015

(65) Prior Publication Data
US 2016/0373925 A1  Dec. 22, 2016

(30) Foreign Application Priority Data
Aug. 6, 2013 (CN) .......................... 2013 1 0339627

(51) Int. Cl.
*H04L 29/06* (2006.01)
*H04W 12/04* (2009.01)
(Continued)

(52) U.S. Cl.
CPC .......... *H04W 12/04* (2013.01); *H04L 63/062* (2013.01); *H04L 63/08* (2013.01);
(Continued)

(58) Field of Classification Search
CPC ...... H04W 12/04; H04W 12/08; H04L 63/062
(Continued)

(56) References Cited

U.S. PATENT DOCUMENTS 7,633,909 B1 * 12/2009 Jones ................. H04L 63/0272
370/338
2007/0036358 A1   2/2007 Nguyen et al.
(Continued)

FOREIGN PATENT DOCUMENTS

CN       101262670 A      9/2008
CN       101860856 A     10/2010
(Continued)

*Primary Examiner* — Haresh N Patel

(57) ABSTRACT

The present application provides a method for interconnection between a terminal device and a gateway device. When the terminal device detects that the terminal device and the gateway device meet a first connection condition and that it is the first time the terminal device is to be connected to the gateway device, acquiring, from the gateway device, a first common SSID preset in the gateway device; and when authentication performed by the terminal device on the acquired first common SSID succeeds, sending a second common SSID preset in the terminal device to the gateway device, so that when authentication performed by the gateway device on the second common SSID succeeds, a common SSID-based connection is established between the terminal device and the gateway device. So using the method, processing of interconnection between a terminal device and a gateway device takes a short time and a process is relatively simple.

14 Claims, 5 Drawing Sheets

(51) Int. Cl.
*H04W 12/06* (2009.01)
*H04W 48/16* (2009.01)
*H04W 48/20* (2009.01)
*H04W 12/08* (2009.01)
*H04W 84/12* (2009.01)
*H04W 88/02* (2009.01)
*H04W 88/16* (2009.01)

(52) U.S. Cl.
CPC ......... *H04L 63/0869* (2013.01); *H04W 12/06* (2013.01); *H04W 12/08* (2013.01); *H04W 48/16* (2013.01); *H04W 48/20* (2013.01); *H04W 84/12* (2013.01); *H04W 88/02* (2013.01); *H04W 88/16* (2013.01)

(58) Field of Classification Search
USPC ............................................................ 726/7
See application file for complete search history.

(56) References Cited

U.S. PATENT DOCUMENTS

| | | |
|---|---|---|
| 2007/0206527 A1 | 9/2007 | Lo et al. |
| 2008/0220741 A1 | 9/2008 | Hung |
| 2009/0046644 A1 | 2/2009 | Krishnaswamy et al. |
| 2010/0124213 A1* | 5/2010 | Ise ................. H04W 12/06 370/338 |
| 2010/0146614 A1* | 6/2010 | Savoor ............. H04L 63/0823 726/10 |
| 2010/0169495 A1* | 7/2010 | Zhang ............. H04W 36/0022 709/227 |
| 2011/0205956 A1* | 8/2011 | Inada ................. H04W 84/12 370/315 |
| 2012/0072976 A1* | 3/2012 | Patil ................. H04W 12/06 726/6 |
| 2012/0233672 A1* | 9/2012 | Kezys ............... H04L 63/0428 726/5 |
| 2012/0320401 A1* | 12/2012 | Shibata ............. H04L 63/083 358/1.14 |
| 2013/0183935 A1* | 7/2013 | Holostov ........... H04W 12/06 455/411 |
| 2013/0298209 A1* | 11/2013 | Targali ............. H04L 63/0815 726/6 |
| 2014/0056131 A1* | 2/2014 | Song ............... H04W 28/0289 370/230 |
| 2014/0059351 A1* | 2/2014 | Braskich ............. G06F 21/36 713/171 |
| 2015/0078283 A1* | 3/2015 | Nakamura, Jr. ...... H04W 12/06 370/329 |

FOREIGN PATENT DOCUMENTS

| | | |
|---|---|---|
| CN | 102685745 A | 9/2012 |
| CN | 103096307 A | 5/2013 |
| CN | 103139848 A | 6/2013 |
| CN | 103220669 A | 7/2013 |

* cited by examiner

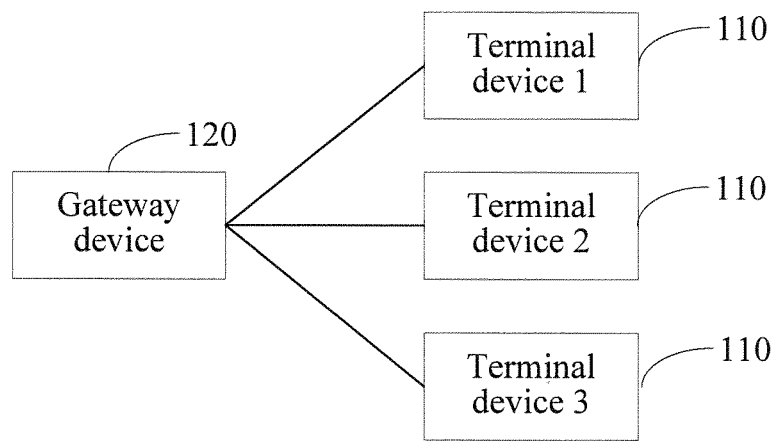

FIG. 1A

When a terminal device detects that the terminal device and a gateway device meet a first connection condition and that it is the first time the terminal device is to be connected to the gateway device, acquire, from the gateway device, a first common SSID preset in the gateway device — 101

When authentication performed by the terminal device on the acquired first common SSID succeeds, send a second common SSID to the gateway device, so that when authentication performed by the gateway device on the second common SSID succeeds, a common SSID-based connection is established between the terminal device and the gateway device — 102

FIG. 1

METHOD AND APPARATUS FOR ESTABLISHING SSID-BASED CONNECTION BETWEEN TERMINAL DEVICE AND GATEWAY DEVICE

CROSS REFERENCE TO RELATED APPLICATIONS

The present application claims priority under 35 U.S.C. §365 to International Patent Application No. PCT/CN2014/083731 filed Aug. 5, 2014. International Patent Application No. PCT/CN2014/083731 claims priority under 35 U.S.C. §365 and/or 35 U.S.C. §119(a) to Chinese Patent Application No. 201310339627.5 filed Aug. 6, 2013 and which are incorporated herein by reference into the present disclosure as if fully set forth herein.

TECHNICAL FIELD

The present invention relates to the communications field, and in particular, to a method and an apparatus for interconnection between a terminal device and a gateway device.

BACKGROUND

Future home solutions are becoming intelligent and diversified; therefore, interconnection and association between home terminals are also implemented in diversified manners. For example, currently, manners for interconnection inside a home may be classified into wireless interconnection manners and wired interconnection manners according to physical media. Indoor wireless interconnection manners include Wireless Fidelity (Wifi, wireless fidelity), Zigbee, Zwave, and the like, and indoor wired interconnection manners include electrical wiring (Homplug), coaxial cabling (Moca), telephone wiring (HPNA), electrical wiring/coaxial cabling/telephone wiring (G.hn), and the like.

Because cabling and networking manners inside different homes are different, different types of terminals are used inside the homes, and manners used for interconnection between terminals are also different, which affect final consumer experience and usability.

For example, if various terminals such as a mobile phone, a set top box, and a tablet computer used inside a home are connected to the Internet (Internet) by using a router, when the mobile phone, the set top box, the tablet computer, and the like are interconnected to the router for the first time, a user needs to manually open a configuration page to enter login information of the router, and then interconnection between the mobile phone, the set top box, the tablet computer, and the like and the router can be implemented. The user needs to manually perform a login operation in this interconnection process, and interconnection processing takes a long time and a process is complex.

SUMMARY

A method and an apparatus for interconnection between a terminal device and a gateway device are provided, so that interconnection processing takes a short time and a process is relatively simple.

According to a first aspect, a method for interconnection between a terminal device and a gateway device is provided, where the method includes:

when the terminal device detects that the terminal device and the gateway device meet a first connection condition and that it is the first time the terminal device is to be connected to the gateway device, acquiring, from the gateway device, a first common SSID preset in the gateway device; and when authentication performed by the terminal device on the acquired first common SSID succeeds, sending a second common SSID preset in the terminal device to the gateway device, so that when authentication performed by the gateway device on the second common SSID succeeds, a common SSID-based connection is established between the terminal device and the gateway device.

With reference to the first aspect, in a first possible implementation manner of the first aspect, that the terminal device detects that the terminal device and the gateway device meet the first connection condition includes:

detecting, by the terminal device, that a preset physical cable between the terminal device and the gateway device has been connected; or detecting, by the terminal device, that strength of a wireless signal between the terminal device and the gateway device satisfies a preset strength threshold.

With reference to the first aspect and/or the first possible implementation manner of the first aspect, in a second possible implementation manner of the first aspect, the method further includes:

receiving and storing, by the terminal device, a private SSID and a key of the gateway device that are sent by the gateway device, where the private SSID and the key are sent after the authentication performed by the gateway device on the second common SSID succeeds; and disconnecting, by the terminal device, the common SSID-based connection between the terminal device and the gateway device, and sending the private SSID and the key of the gateway device to the gateway device, so that when authentication performed by the gateway device on the private SSID and the key succeeds, a private SSID-based connection is established between the terminal device and the gateway device.

With reference to the second possible implementation manner of the first aspect, in a third possible implementation manner of the first aspect, the method further includes:

when the terminal device detects that the terminal device and the gateway device meet a second connection condition and that it is not the first time the terminal device is to be connected to the gateway device, acquiring the private SSID and a password of the gateway device; and sending, by the terminal device, the private SSID and the key of the gateway device to the gateway device, so that when authentication performed by the gateway device on the private SSID and the key succeeds, a private SSID-based connection is established between the terminal device and the gateway device.

With reference to the third possible implementation manner of the first aspect, in a fourth possible implementation manner of the first aspect, that the terminal device detects that the terminal device and the gateway device meet the second connection condition includes:

detecting, by the terminal device, that the preset physical cable between the terminal device and the gateway device has been connected; or detecting, by the terminal device, a wireless signal of the gateway device.

According to a second aspect, a method for interconnection between a terminal device and a gateway device is provided, where the method includes:

when the terminal device acquires a common SSID from the gateway device, sending, by the gateway device, a first common SSID preset locally to the terminal device;

receiving, by the gateway device, a second common SSID that is preset in the terminal device and is sent by the terminal device after authentication performed by the terminal device on the first common SSID succeeds; and if authentication performed by the gateway device on the second common SSID succeeds, establishing a common SSID-based connection between the terminal device and the gateway device.

With reference to the second aspect, in a first possible implementation manner of the second aspect, the method further includes:

after the authentication performed by the gateway device on the second common SSID succeeds, sending a private SSID and a key of the gateway device to the terminal device;

disconnecting, by the gateway device, the common SSID-based connection between the gateway device and the terminal device;

receiving, by the gateway device, the private SSID and the key that are sent by the terminal device; and if authentication performed by the gateway device on the received private SSID and key succeeds, establishing a private SSID-based connection between the gateway device and the terminal device.

With reference to the first possible implementation manner of the second aspect, in a second possible implementation manner of the second aspect, the method further includes:

when the terminal device detects that the terminal device and the gateway device meet a second connection condition and that it is not the first time the terminal device is to be connected to the gateway device, receiving, by the gateway device, the private SSID and the key that are sent by the terminal device; and if authentication performed by the gateway device on the received private SSID and key, establishing a private SSID-based connection between the gateway device and the terminal device.

According to a third aspect, an apparatus for interconnection between a terminal device and a gateway device is provided, where the apparatus includes:

a first detecting unit, configured to detect whether the terminal device and the gateway device meet a first connection condition and whether it is the first time the terminal device is to be connected to the gateway device;

a first acquiring unit, configured to: when the first detecting unit detects that the terminal device and the gateway device meet the first connection condition and that it is the first time the terminal device is to be connected to the gateway device, acquire, from the gateway device, a first common SSID preset in the gateway device;

a first authentication unit, configured to perform authentication on the first common SSID acquired by the first acquiring unit; and a first sending unit, configured to: when the authentication performed by the first authentication unit on the first common SSID succeeds, send a second common SSID preset in the terminal device to the gateway device, so that when authentication performed by the gateway device on the second common SSID succeeds, a common SSID-based connection is established between the terminal device and the gateway device.

With reference to the third aspect, in a first possible implementation manner of the third aspect, the first detecting unit is specifically configured to:

detect whether a preset physical cable between the terminal device and the gateway device has been connected; or detect whether strength of a wireless signal between the terminal device and the gateway device satisfies a preset strength threshold.

With reference to the third aspect and/or the first possible implementation manner of the third aspect, in a second possible implementation manner of the third aspect, the apparatus further includes:

a processing unit, configured to receive and store a private SSID and a key of the gateway device that are sent by the gateway device, where the private SSID and the key are sent after the authentication performed by the gateway device on the second common SSID succeeds; and a first disconnecting unit, configured to: after the processing unit receives the private SSID and the key, disconnect the common SSID-based connection between the terminal device and the gateway device; where the first sending unit is further configured to send the private SSID and the key of the gateway device to the gateway device, so that when authentication performed by the gateway device on the private SSID and the key succeeds, a private SSID-based connection is established between the terminal device and the gateway device.

With reference to the second possible implementation manner of the third aspect, in a third possible implementation manner of the third aspect, the apparatus further includes:

a second detecting unit, configured to detect whether the terminal device and the gateway device meet a second connection condition and whether it is the first time the terminal device is to be connected to the gateway device; and a second acquiring unit, configured to: when the second detecting unit detects that the terminal device and the gateway device meet the second connection condition and that it is not the first time the terminal device is to be connected to the gateway device, acquire the private SSID and a password of the gateway device; where the first sending unit is further configured to send the private SSID and the key of the gateway device, so that when authentication performed by the gateway device on the private SSID and the key succeeds, a private SSID-based connection is established between the terminal device and the gateway device.

With reference to the third possible implementation manner of the third aspect, in a fourth possible implementation manner of the third aspect, the second detecting unit is specifically configured to:

detect whether the preset physical cable between the terminal device and the gateway device has been connected; or detect whether the terminal device receives a wireless signal of the gateway device.

According to a fourth aspect, an apparatus for interconnection between a terminal device and a gateway device is provided, where the apparatus includes:

a second sending unit, configured to: when the terminal device acquires a common SSID from the gateway device, send a first common SSID preset in the gateway device to the terminal device;

a receiving unit, configured to receive a second common SSID that is preset in the terminal device and is sent by the terminal device after authentication performed by the terminal device on the first common SSID sent by the second sending unit succeeds; and a second authentication unit, configured to perform authentication on the second common SSID received by the receiving unit, so that if authentication performed by the gateway device on the second common SSID succeeds, a common SSID-based connection is established between the terminal device and the gateway device.

With reference to the fourth aspect, in a first possible implementation manner of the fourth aspect, the apparatus further includes:

the second sending unit, further configured to: after the authentication performed by the second authentication unit on the second common SSID succeeds, send a private SSID and a key of the gateway device to the terminal device;

a second disconnecting unit, configured to: after the second sending unit sends the private SSID and the key, disconnect the common SSID-based connection between the gateway device and the terminal device;

the receiving unit, further configured to: after the second disconnecting unit disconnects the common SSID-based connection, receive a private SSID and a key that are sent by the terminal device; and a third authentication unit, configured to perform authentication on the received private SSID and key, so that if the authentication succeeds, a private SSID-based connection is established between the gateway device and the terminal device.

With reference to the first possible implementation manner of the fourth aspect, in a second possible implementation manner of the fourth aspect, the receiving unit is further configured to: when the terminal device detects that the terminal device and the gateway device meet a second connection condition and that it is not the first time the terminal device is to be connected to the gateway device, receive the private SSID and the key that are sent by the terminal device; and the third authentication unit is further configured to perform authentication on the received private SSID and key, so that if the authentication succeeds, a private SSID-based connection is established between the gateway device and the terminal device.

A second common SSID is preset in a terminal device, and a first common SSID is preset in a gateway device; when the terminal device detects that the terminal device and the gateway device meet a first connection condition and that it is the first time the terminal device is to be connected to the gateway device, the first common SSID preset in the gateway device is acquired from the gateway device; and when authentication performed by the terminal device on the acquired first common SSID succeeds, the second common SSID preset in the terminal device is sent to the gateway device, so that when authentication performed by the gateway device on the second common SSID succeeds, a common SSID-based connection is established between the terminal device and the gateway device. In an entire interconnection process, a user does not need to manually trigger login, and the user does not need to manually enter login information either, thereby shortening a time for processing interconnection between the terminal device and the gateway device. In addition, the interconnection process requires no participation of the user, and therefore, the interconnection process is simple.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1A is an exemplary diagram of an application scenario according to an embodiment of the present invention;

FIG. 1 is a schematic diagram of a first embodiment of a method for interconnection between a terminal device and a gateway device according to the present invention;

DETAILED DESCRIPTION

Figure 2:
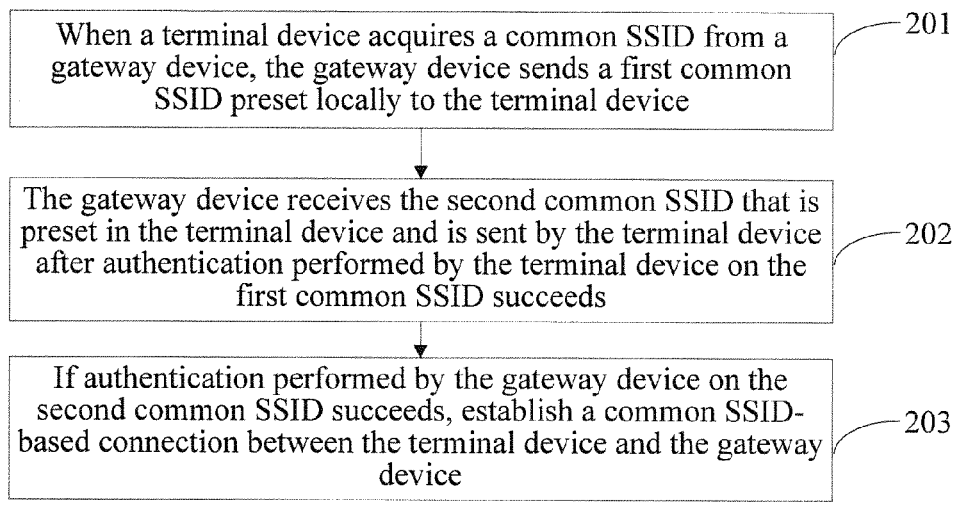
FIG. 2 is a schematic diagram of a second embodiment of a method for interconnection between a terminal device and a gateway device according to the present invention.

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Referring to FIG. 1A, FIG. 1A shows an example of an application scenario of a method and an apparatus for interconnection between a terminal device and a gateway device according to an embodiment of the present invention. Multiple terminal devices 110 each are interconnected to a gateway device 120, and implement Internet access by using the gateway device 120. The terminal device 110 may be an intelligent device such as a mobile phone, a personal computer (PC, personal computer), a tablet computer, or a set top box. The gateway device may be a wireless access point (AP, access point), a router, or the like.

Referring to FIG. 1, FIG. 1 is a schematic diagram of a first embodiment of a method for interconnection between a terminal device and a gateway device according to the present invention. In the method, a second public service set identifier (SSID, Service Set Identifier) is preset in the terminal device, and a first common SSID is preset in the gateway device. A common SSID is a concept corresponding to a private SSID of a device. Both the second common SSID and the first common SSID are common SSIDs, and may be a same common SSID or different common SSIDs, where the first and the second herein are only used for distinguishing whether the common SSID is set in the terminal device or in the gateway device.

The method further includes:

Step 101: When the terminal device detects that the terminal device and the gateway device meet a first connection condition and that it is the first time the terminal device is to be connected to the gateway device, acquire, from the gateway device, the first common SSID preset in the gateway device.

Step 102: When authentication performed by the terminal device on the acquired first common SSID succeeds, send the second common SSID preset in the terminal device to the gateway device, so that when authentication performed by the gateway device on the second common SSID succeeds, a common SSID-based connection is established between the terminal device and the gateway device.

In this embodiment, when the terminal device detects that the terminal device and the gateway device meet a first connection condition and that it is the first time the terminal device is to be connected to the gateway device, a first common SSID preset in the gateway device is acquired from the gateway device; and when authentication performed by the terminal device on the acquired first common SSID succeeds, a second common SSID preset in the terminal device is sent to the gateway device, so that when authentication performed by the gateway device on the second common SSID succeeds, a common SSID-based connection is established between the terminal device and the gateway device. In an entire interconnection process, a user does not need to manually trigger login, and the user does not need to manually enter login information either, thereby shortening a login processing time. In addition, the interconnection process requires no participation of the user, and therefore, the interconnection process is simple.

Referring to FIG. 2, FIG. 2 is a schematic diagram of a second embodiment of a method for interconnection between a terminal device and a gateway device according to the present invention. In the method, a second common SSID is preset in the terminal device, and a first common SSID is preset in the gateway device. The method further includes:

Step 201: When the terminal device acquires a common SSID from the gateway device, the gateway device sends the first common SSID preset locally to the terminal device.

Step 202: The gateway device receives the second common SSID that is preset in the terminal device and is sent by the terminal device after authentication performed by the terminal device on the first common SSID succeeds.

Step 203: If authentication performed by the gateway device on the second common SSID succeeds, establish a common SSID-based connection between the terminal device and the gateway device.

In this embodiment, when a terminal device acquires a common SSID from a gateway device, the gateway device sends a first common SSID preset locally to the terminal device; the gateway device receives a second common SSID that is sent by the terminal device after authentication performed by the terminal device on the first common SSID succeeds; and if authentication performed by the gateway device on the second common SSID succeeds, a common SSID-based connection is established between the terminal device and the gateway device. In an entire interconnection process, a user does not need to manually trigger login, and the user does not need to manually enter login information either, thereby shortening a time for processing interconnection between the terminal device and the gateway device. In addition, the interconnection process requires no participation of the user and is automatically completed between the terminal device and the gateway device, and therefore, the interconnection process is simple.

Figure 3:
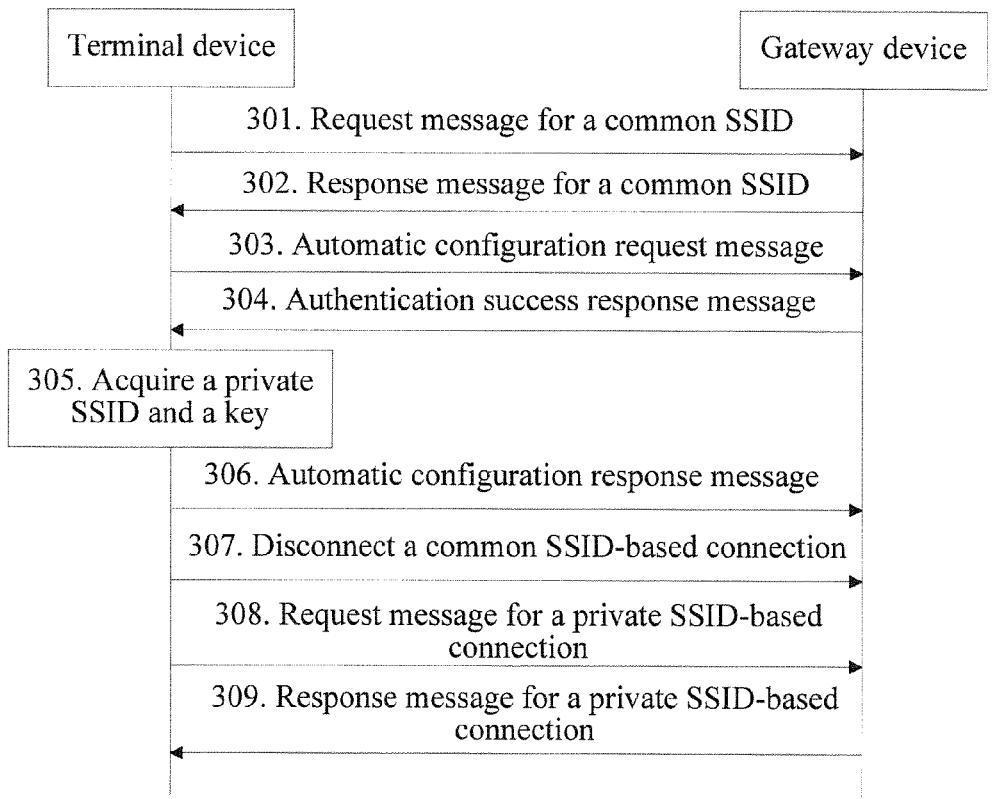
FIG. 3 is a schematic diagram of a third embodiment of a method for interconnection between a terminal device and a gateway device according to the present invention.

Referring to FIG. 3, FIG. 3 is a schematic diagram of a second embodiment of a method for interconnection between a terminal device and a gateway device according to the present invention. In the method, a second common SSID is preset in the terminal device, and a first common SSID is preset in the gateway device. The method is an interconnection method when it is the first time the terminal device is to be interconnected to the gateway device, and the method includes:

Step 301: When the terminal device detects that the terminal device and the gateway device meet a first connection condition and that it is the first time the terminal device is to be connected to the gateway device, send, to the gateway device, a request message for a common SSID-based connection.

The request message for a common SSID-based connection is used to request, from the gateway device, a common SSID preset in the gateway device.

That the terminal device detects that the terminal device and the gateway device meet the first connection condition may include: detecting, by the terminal device, that a preset physical cable between the terminal device and the gateway device has been connected; or detecting, by the terminal device, that strength of a wireless signal between the terminal device and the gateway device satisfies a preset strength threshold.

The physical cable may include an electrical wire, a coaxial cable, a telephone wire, a network cable, and the like.

The wireless signal detected by the terminal device varies with different communications technologies used between the terminal device and the gateway device.

A method for detecting, by the terminal device, whether it is the first time the terminal device is to be connected to the gateway device includes:

acquiring, by the terminal device, a device identifier of the gateway device;

searching, by the terminal device, to find whether a private SSID and a key that correspond to the device identifier of the gateway device are stored locally; and if the private SSID and the key that correspond to the device identifier of the gateway device are not stored locally, determining, by the terminal device, that it is the first time the terminal device is to be connected to the gateway device; or if the private SSID and the key that correspond to the device identifier of the gateway device are stored locally, determining, by the terminal device, that it is not the first time the terminal device is to be connected to the gateway device.

The device identifier of the gateway device may be an SSID of the gateway device, and the SSID of the gateway device is used to uniquely identify the gateway device.

The device identifier of the gateway device may be sent to the terminal device by the gateway device.

Step 302: The gateway device receives the request message for a common SSID-based connection, adds the first common SSID preset locally into a response message for a common SSID-based connection, and sends, to the terminal device, the response message for a common SSID-based connection.

The first common SSID preset in the gateway device may be set in the gateway device at the time of delivery of the gateway device, or may be set in the gateway device manually after delivery of the gateway device, which is not limited herein.

Step 303: The terminal device receives the response message for a common SSID-based connection, acquires the first common SSID from the response message for a common SSID-based connection, performs authentication on the first common SSID, and when the authentication succeeds, adds the second common SSID preset locally in the terminal device into an automatic configuration request message, and sends the automatic configuration request message to the gateway device.

When the authentication performed by the terminal device on the first common SSID fails, the terminal device may directly interrupt interconnection to the gateway device, may interrupt interconnection to the gateway device after sending an authentication failure message to the gateway device, or the like.

The second common SSID preset in the terminal device may be set in the terminal device at the time of delivery of the terminal device, or may be set in the terminal device manually after delivery of the terminal device, which is not limited herein.

For details about how the terminal device performs authentication on the common SSID preset in the gateway device, refer to the description in step 304, and details are not provided herein.

Step 304: The gateway device receives the automatic configuration request message, acquires the second common SSID from the automatic configuration request message, performs authentication on the second common SSID, and when the authentication succeeds, determines a private SSID and a key of the gateway device, adds the private SSID and the key into an authentication success response message, and sends the authentication success response message to the terminal device.

That the gateway device determines the private SSID and the key of the gateway device may include: acquiring the private SSID and the key of the gateway device that are preset locally in the gateway device; or generating a private SSID and a key of the gateway device, and using the generated private SSID and key as the private SSID and the key of the gateway device.

The second common SSID and the first common SSID may be the same or different, and their implementation manners may be the same or different. A method for performing authentication on the second common SSID by the gateway device and a method for performing authentication on the first common SSID by the terminal device may also be the same or different, and a specific authentication method is not limited herein.

For example, assuming that the second common SSID and the first common SSID are the same, when performing authentication on the second common SSID, the gateway device may directly compare the second common SSID with the first common SSID that is preset locally; if a comparison result is that the second common SSID and the first common SSID are the same, the authentication succeeds; and if the comparison result is that the second common SSID and the first common SSID are different, the authentication fails. Similarly, when performing authentication on the first common SSID, the terminal device may directly compare the first common SSID with the second common SSID that is preset locally; if a comparison result is that the first common SSID and the second common SSID are the same, the authentication succeeds; and if the comparison result is that the first common SSID and the second common SSID are different, the authentication fails.

Step 305: The terminal device receives the authentication success response message, and acquires the private SSID and the key of the gateway device from the authentication success response message, and stores the private SSID and the key of the gateway device.

If the terminal device has received the authentication success response message, it indicates that a common SSID-based connection is successfully established between the terminal device and the gateway device.

With reference to step 301, when storing the private SSID and the key of the gateway device, the terminal device may store the private SSID and the key and an SSID of the gateway device correspondingly.

Step 306: The terminal device sends an automatic configuration completion response message to the gateway device, so as to notify the gateway device that the private SSID and the key has been acquired and stored.

Step 307: The gateway device and the terminal device disconnect the common SSID-based connection between the gateway device and the terminal device.

Specifically, the gateway device and the terminal device may disconnect the common SSID-based connection between the gateway device and the terminal device through the following process:

sending, by the gateway device to the terminal device, a request message for disconnecting the common SSID-based connection, so as to request the terminal device to disconnect the common SSID-based connection; and sending, by the terminal device to the gateway device, a response message for disconnecting the common SSID-based connection.

Step 308: The terminal device sends, to the gateway device, a request message for a private SSID-based connection, where the request message for a private SSID-based connection carries the private SSID and the key of the gateway device.

Step 309: The gateway device receives the request message for a private SSID-based connection, acquires the private SSID and the key from the request message for a private SSID-based connection, performs authentication on the private SSID and the key, and sends, to the terminal device, a response message for a private SSID-based connection when the authentication succeeds, so as to establish a private SSID-based connection between the terminal device and the gateway device.

When performing authentication on the received private SSID and key, the gateway device may directly compare the received private SSID and key with the private SSID and the key of the gateway device; if a comparison result is that the received private SSID and key and the private SSID and the key of the gateway device are the same, the authentication succeeds; and if the comparison result is that the received private SSID and key and the private SSID and the key of the gateway device are different, the authentication fails.

In this embodiment, when it is the first time a terminal device is to be connected to a gateway device, a common SSID-based connection is established between the terminal device and the gateway device according to a preset second common SSID and first common SSID, so as to implement interconnection between the terminal device and the gateway device. This interconnection process requires no participation of a user, and communication and processing are directly performed between the terminal device and the gateway device, thereby shortening a time for processing interconnection between the terminal device and the gateway device. In addition, this interconnection process is simple.

Then, the gateway device delivers a private SSID and a key of the gateway device to the terminal device, and the gateway device and the terminal device disconnect the common SSID-based connection and establish a private SSID-based connection, thereby ensuring security of interconnection between the terminal device and the gateway device.

Figure 4:
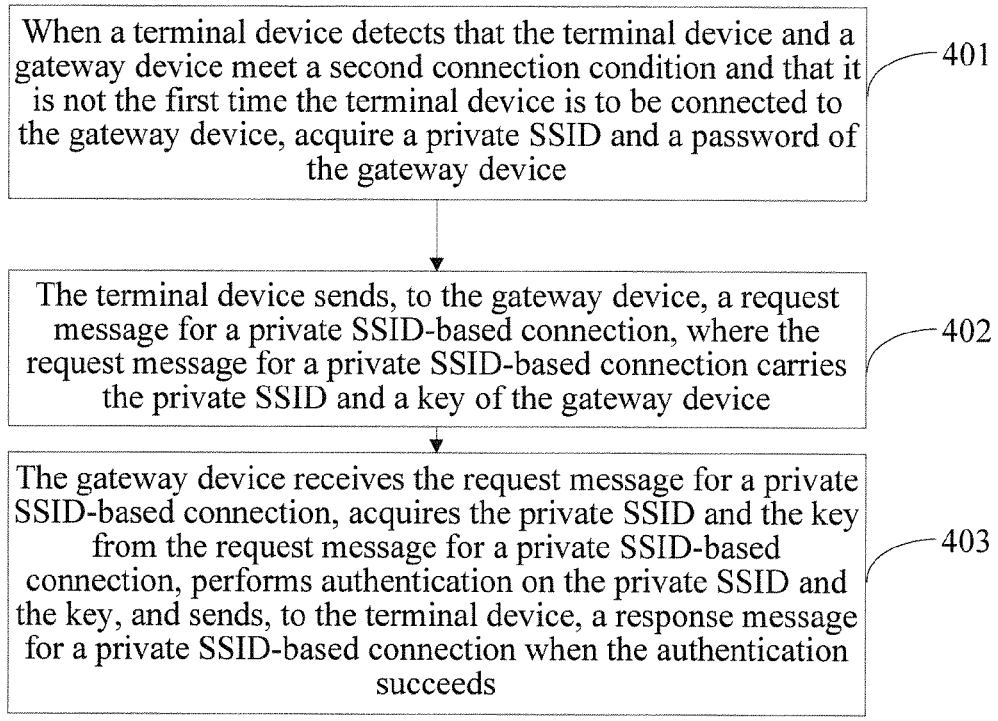
FIG. 4 is a schematic diagram of a fourth embodiment of a method for interconnection between a terminal device and a gateway device according to the present invention.

After the terminal device and the gateway device disconnect the private SSID-based connection that is established for the first time in FIG. 3, if the terminal device needs to be interconnected to the gateway device again, for an interconnection method, refer to FIG. 4. The method includes:

Step 401: When the terminal device detects that the terminal device and the gateway device meet a second connection condition and that it is not the first time the terminal device is to be connected to the gateway device, acquire the private SSID and a password of the gateway device.

That the terminal device detects that the terminal device and the gateway device meet the second connection condition may include:

detecting, by the terminal device, that the preset physical cable between the terminal device and the gateway device has been connected; or detecting, by the terminal device, a wireless signal of the gateway device.

When the terminal device detects that the terminal device and the gateway device do not meet the second connection condition, it indicates that the terminal device and the gateway device do not satisfy an interconnection condition, and the terminal device may continue detection until the second connection condition is met.

For a method for detecting, by the terminal device, whether it is first time the terminal device is to be connected to the gateway device, refer to the corresponding description in step 301, and details are not provided herein.

Step 402: The terminal device sends, to the gateway device, a request message for a private SSID-based connection, where the request message for a private SSID-based connection carries the private SSID and the key of the gateway device.

Step 403: The gateway device receives the request message for a private SSID-based connection, acquires the private SSID and the key from the request message for a private SSID-based connection, performs authentication on the private SSID and the key, and sends, to the terminal device, a response message for a private SSID-based connection when the authentication succeeds, so as to establish a private SSID-based connection between the terminal device and the gateway device.

In this embodiment, when it is not the first time a terminal device is to be interconnected to a gateway device, interconnection based on a private SSID and a key that are delivered to the terminal device by the gateway device is implemented between the terminal device and the gateway device according to the private SSID and the key. This interconnection process requires no participation of a user, and communication and processing are directly performed between the terminal device and the gateway device, thereby shortening a time for processing interconnection between the terminal device and the gateway device. In addition, this interconnection process is simple.

Figure 5:
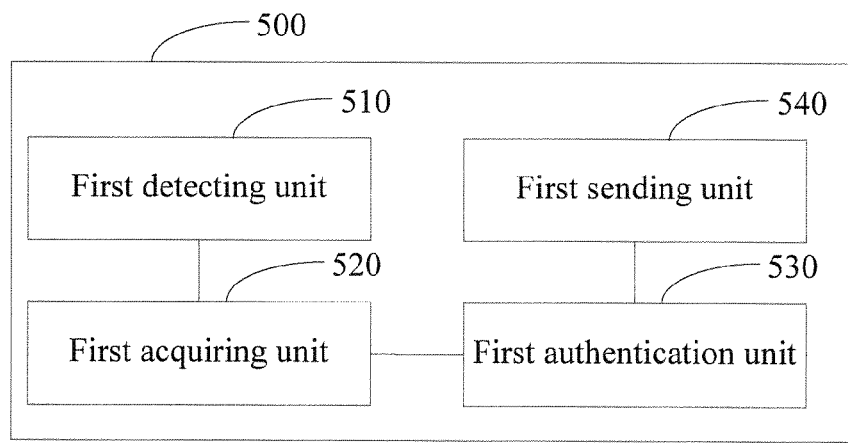
FIG. 5 is a schematic diagram of a first embodiment of an apparatus for interconnection between a terminal device and a gateway device according to the present invention.

Referring to FIG. 5, FIG. 5 is a schematic diagram of a first embodiment of an apparatus for interconnection between a terminal device and a gateway device according to the present invention. The apparatus may be disposed in the terminal device, and the apparatus 500 includes:

a first detecting unit 510, configured to detect whether terminal device and the gateway device meet a first connection condition and whether it is the first time the terminal device is to be connected to the gateway device;

a first acquiring unit 520, configured to: when the first detecting unit 510 detects that the terminal device and the gateway device meet the first connection condition and that it is the first time the terminal device is to be connected to the gateway device, acquire, from the gateway device, a first common SSID preset in the gateway device;

a first authentication unit 530, configured to perform authentication on the first common SSID acquired by the first acquiring unit 520; and a first sending unit 540, configured to: when the authentication performed by the first authentication unit 530 on the first common SSID succeeds, send a second common SSID preset in the terminal device to the gateway device, so that when authentication performed by the gateway device on the second common SSID succeeds, a common SSID-based connection is established between the terminal device and the gateway device.

Preferably, the first detecting unit 510 may be specifically configured to:

detect whether a preset physical cable between the terminal device and the gateway device has been connected; or detect whether strength of a wireless signal between the terminal device and the gateway device satisfies a preset strength threshold.

Preferably, the apparatus 500 may further include:

a processing unit, configured to receive and store a private SSID and a key of the gateway device that are sent by the gateway device, where the private SSID and the key are sent after the authentication performed by the gateway device on the second common SSID succeeds; and a first disconnecting unit, configured to: after the processing unit receives the private SSID and the key, disconnect the common SSID-based connection between the terminal device and the gateway device; where the first sending unit may be further configured to send the private SSID and the key of the gateway device to the gateway device, so that when authentication performed by the gateway device on the private SSID and the key succeeds, a private SSID-based connection is established between the terminal device and the gateway device.

Preferably, the apparatus 500 may further include:

a second detecting unit, configured to detect whether the terminal device and the gateway device meet a second connection condition and whether it is the first time the terminal device is to be connected to the gateway device; and a second acquiring unit, configured to: when the second detecting unit detects that the terminal device and the gateway device meet the second connection condition and that it is not the first time the terminal device is to be connected to the gateway device, acquire the private SSID and a password of the gateway device; where the first sending unit may be further configured to send the private SSID and the key of the gateway device, so that when authentication performed by the gateway device on the private SSID and the key succeeds, a private SSID-based connection is established between the terminal device and the gateway device.

Preferably, the second detecting unit may be specifically configured to:

detect whether the preset physical cable between the terminal device and the gateway device has been connected; or detect whether the terminal device receives a wireless signal of the gateway device.

In this embodiment, when it is detected that the terminal device and the gateway device meet a first connection condition and that it is the first time the terminal device is to be connected to the gateway device, a first common SSID preset in the gateway device is acquired from the gateway device; and when authentication performed on the acquired first common SSID succeeds, a second common SSID preset in the terminal device is sent to the gateway device, so that when authentication performed by the gateway device on the second common SSID succeeds, a common SSID-based connection is established between the terminal device and the gateway device. In an entire interconnection process, a user does not need to manually trigger login, and the user does not need to manually enter login information either, thereby shortening a login processing time. In addition, the interconnection process requires no participation of the user, and therefore, the interconnection process is simple.

Figure 6:
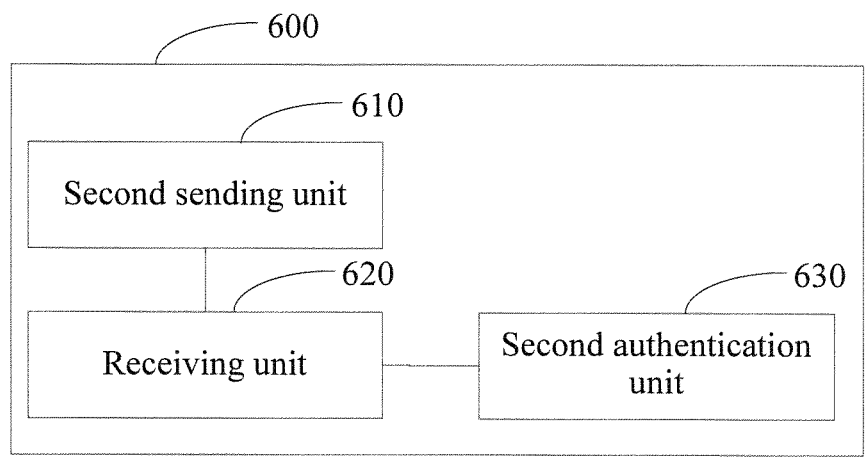
FIG. 6 is a schematic diagram of a second embodiment of an apparatus for interconnection between a terminal device and a gateway device according to the present invention.

Referring to FIG. 6, FIG. 6 is a schematic diagram of a second embodiment of an apparatus for interconnection between a terminal device and a gateway device according to the present invention. The apparatus may be disposed in the gateway device, and the apparatus 600 includes:

a second sending unit 610, configured to: when the terminal device acquires a common SSID from the gateway device, send a first common SSID preset in the gateway device to the terminal device;

a receiving unit 620, configured to receive a second common SSID that is preset in the terminal device and is sent by the terminal device after authentication performed by the terminal device on the first common SSID sent by the second sending unit 610 succeeds; and a second authentication unit 630, configured to perform authentication on the second common SSID received by the receiving unit 620, so that if authentication performed by the gateway device on the second common SSID succeeds, a common SSID-based connection is established between the terminal device and the gateway device.

Preferably, the apparatus may further include:

the second sending unit 610, which may be further configured to: after the authentication performed by the second authentication unit on the second common SSID succeeds, send a private SSID and a key of the gateway device to the terminal device;

a second disconnecting unit, configured to: after the second sending unit sends the private SSID and the key, disconnect the common SSID-based connection between the gateway device and the terminal device;

the receiving unit 620, which may be further configured to: after the second disconnecting unit disconnects the common SSID-based connection, receive a private SSID and a key that are sent by the terminal device; and a third authentication unit, configured to perform authentication on the received private SSID and key, so that if the authentication succeeds, a private SSID-based connection is established between the gateway device and the terminal device.

Preferably, the receiving unit 620 may be further configured to: when the terminal device detects that the terminal device and the gateway device meet a second connection condition and that it is not the first time the terminal device is to be connected to the gateway device, receive the private SSID and the key that are sent by the terminal device; and the third authentication unit may be further configured to perform authentication on the received private SSID and key, so that if the authentication succeeds, a private SSID-based connection is established between the gateway device and the terminal device.

In this embodiment, when a terminal device acquires a common SSID from a gateway device, a first common SSID preset locally is sent to the terminal device; a second common SSID that is sent after authentication performed by the terminal device on the first common SSID succeeds is received; and if authentication performed by the gateway device on the second common SSID succeeds, a common SSID-based connection is established between the terminal device and the gateway device. In an entire interconnection process, a user does not need to manually trigger login, and the user does not need to manually enter login information either, thereby shortening a time for processing interconnection between the terminal device and the gateway device. In addition, the interconnection process requires no participation of the user and is automatically completed between the terminal device and the gateway device, and therefore, the interconnection process is simple.

Figure 7:
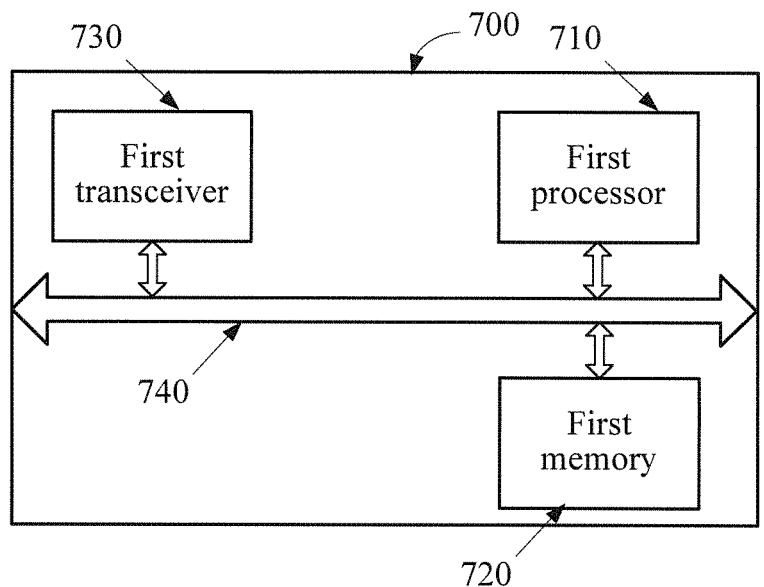
FIG. 7 is a schematic structural diagram of a terminal device according to the present invention.

Referring to FIG. 7, FIG. 7 is a schematic diagram of a hardware structure of a first ingress node according to an embodiment of the present invention. The micro base station includes: a first processor 710, a first memory 720, a first transceiver 730, and a first bus 740.

The first processor 710, the first memory 720, and the first transceiver 730 are connected by using the first bus 740, and the first bus 740 may be an ISA bus, a PCI bus, an EISA bus, or the like. The bus may be classified into an address bus, a data bus, a control bus, and the like. For ease of description, in FIG. 7, the bus is represented by using only a bold line, which does not indicate that there is only one bus or one type of bus.

The first memory 720 is configured to store a program. Specifically, the program may include program code, and the program code includes a computer operation instruction. The first memory 720 may include a high-speed RAM memory, or may include a non-volatile memory (non-volatile memory), for example, at least one magnetic disk memory.

The first processor 710 executes the program code, so as to detect whether a terminal device and the gateway device meet a first connection condition and whether it is the first time the terminal device is to be connected to the gateway device, and to perform authentication on the first common SSID acquired by the first transceiver 730.

The first transceiver 730 is configured to be connected to another device, and communicate with the another device. The first transceiver 730 is configured to: when the first processor 710 detects that the terminal device and the gateway device meet the first connection condition and that it is the first time the terminal device is to be connected to the gateway device, acquire, from the gateway device, the first common SSID preset in the gateway device; and when the authentication performed by the first processor 710 on the acquired first common SSID succeeds, send a second common SSID preset in the terminal device to the gateway device, so that when authentication performed by the gateway device on the second common SSID succeeds, a common SSID-based connection is established between the terminal device and the gateway device.

Preferably, the first processor 710 may be specifically configured to detect whether a preset physical cable between the terminal device and the gateway device has been connected; or detect whether strength of a wireless signal between the terminal device and the gateway device satisfies a preset strength threshold.

Preferably, the first transceiver 730 may be further configured to receive a private SSID and a key of the gateway device that are sent by the gateway device, where the private SSID and the key are sent after the authentication performed by the gateway device on the second common SSID succeeds; disconnect the common SSID-based connection between the terminal device and the gateway device; and send the private SSID and the key of the gateway device to the gateway device, so that when authentication performed by the gateway device on the private SSID and the key succeeds, a private SSID-based connection is established between the terminal device and the gateway device.

The first processor 710 may be further configured to store the private SSID and the key of the gateway device that are sent by the gateway device.

Preferably, the first processor 710 may be further configured to detect whether the terminal device and the gateway device meet a second connection condition and whether it is the first time the terminal device is to be connected to the gateway device.

The first transceiver 730 may be further configured to: when the first processor 710 detects that the terminal device and the gateway device meet the second connection condition and that it is not the first time the terminal device is to be connected to the gateway device, acquire the private SSID and a password of the gateway device; and send the private SSID and the key of the gateway device to the gateway device, so that when authentication performed by the gateway device on the private SSID and the key succeeds, a private SSID-based connection is established between the terminal device and the gateway device.

Preferably, the first processor 710 may be specifically configured to detect whether the preset physical cable between the terminal device and the gateway device has been connected; or detect whether the terminal device receives a wireless signal of the gateway device.

In this embodiment, when the terminal device detects that the terminal device and the gateway device meet a first connection condition and that it is the first time the terminal device is to be connected to the gateway device, a first common SSID preset in the gateway device is acquired from the gateway device; and when authentication performed by the terminal device on the acquired first common SSID succeeds, a second common SSID preset in the terminal device is sent to the gateway device, so that when authentication performed by the gateway device on the second common SSID succeeds, a common SSID-based connection is established between the terminal device and the gateway device. In an entire interconnection process, a user does not need to manually trigger login, and the user does not need to manually enter login information either, thereby shortening a login processing time. In addition, the interconnection process requires no participation of the user, and therefore, the interconnection process is simple.

Figure 8:
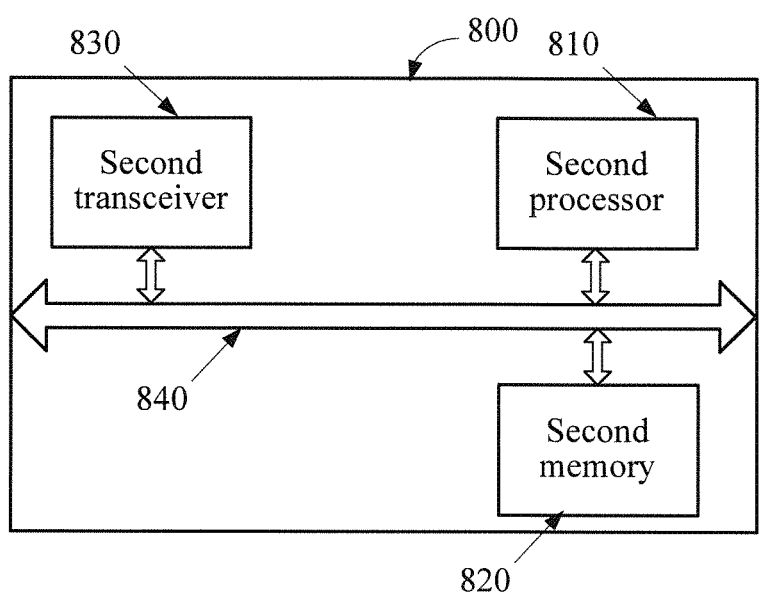
FIG. 8 is a schematic structural diagram of a gateway device according to the present invention.

Referring to FIG. 8, FIG. 8 is a schematic diagram of a hardware structure of a first ingress node according to an embodiment of the present invention. The micro base station includes: a second processor 810, a second memory 820, a second transceiver 830, and a second bus 840.

The second processor 810, the second memory 820, and the second transceiver 830 are connected by using the second bus 840, and the second bus 840 may be an ISA bus, a PCI bus, an EISA bus, or the like. The bus may be classified into an address bus, a data bus, a control bus, and the like. For ease of description, in FIG. 8, the bus is represented by using only a bold line, which does not indicate that there is only one bus or one type of bus.

The second memory 820 is configured to store a program. Specifically, the program may include program code, and the program code includes a computer operation instruction.

The second memory 820 may include a high-speed RAM memory, or may include a non-volatile memory (non-volatile memory), for example, at least one magnetic disk memory.

The second transceiver 830 is configured to be connected to another device, and communicate with the another device. The second transceiver 830 is configured to: when the terminal device acquires a common SSID from the gateway device, send a first common SSID preset locally to the terminal device; receive a second common SSID that is preset in the terminal device and is sent by the terminal device after authentication performed by the terminal device on the first common SSID succeeds; and if authentication performed by the second processor 810 on the second common SSID succeeds, establish a common SSID-based connection between the terminal device and the gateway device.

The second processor 810 executes the program code, so as to perform authentication on the second common SSID received by the second transceiver.

Preferably, the second transceiver 830 may be further configured to: after the authentication performed on the second common SSID succeeds, send a private SSID and a key of the gateway device to the terminal device; disconnect the common SSID-based connection between the gateway device and the terminal device; receive the private SSID and the key that are sent by the terminal device; and if authentication performed by the second processor 810 on the private SSID and the key succeeds, establish a private SSID-based connection between the gateway device and the terminal device.

The second processor 810 may be further configured to perform authentication on the private SSID and the key.

Preferably, the second transceiver 830 may be further configured to: when the terminal device detects that the terminal device and the gateway device meet a second connection condition and that it is not the first time the terminal device is to be connected to the gateway device, receive the private SSID and the key of the gateway device that are sent by the terminal device; and if authentication performed by the second processor 810 on the private SSID and the key succeeds, establish a private SSID-based connection between the gateway device and the terminal device.

The second processor 810 may be further configured to perform authentication on the private SSID and the key.

In this embodiment, when a terminal device acquires a common SSID from a gateway device, the gateway device sends a first common SSID preset locally to the terminal device; the gateway device receives a second common SSID that is sent by the terminal device after authentication performed by the terminal device on the first common SSID succeeds; and if authentication performed by the gateway device on the second common SSID succeeds, a common SSID-based connection is established between the terminal device and the gateway device. In an entire interconnection process, a user does not need to manually trigger login, and the user does not need to manually enter login information either, thereby shortening a time for processing interconnection between the terminal device and the gateway device. In addition, the interconnection process requires no participation of the user and is automatically completed between the terminal device and the gateway device, and therefore, the interconnection process is simple.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The computer software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to each other, and each embodiment focuses on differences from other embodiments. Especially, a system embodiment is basically similar to a method embodiment, and therefore is described briefly; and for the associated part, reference may be made to the method embodiment.

The foregoing descriptions are implementation manners of the present invention, but are not intended to limit the protection scope of the present invention. Any modification, equivalent replacement, and improvement made within the spirit and principle of the present invention shall fall within the protection scope of the present invention.

What is claimed is:

1. A method for connecting a terminal device to a gateway device, the method comprising:
    acquiring, by the terminal device, from the gateway device, a first common service set identifier (SSID) preset in the gateway device, in response to the terminal device detecting that (i) the terminal device and the gateway device meet a first connection condition and (ii) it is the first time the terminal device is to be connected to the gateway device;
    sending, by the terminal device, a second common SSID that is preset in the terminal device after authentication performed on the first common SSID succeeds;
    establishing a common SSID-based connection between the terminal device and the gateway device, when authentication performed by the gateway device on the second common SSID succeeds;
    receiving, by the terminal device from the gateway device, a private SSID and a key of the gateway device;
    disconnecting, by the terminal device, the common SSID-based connection between the terminal device and the gateway device;
    sending, by the terminal device, the private SSID and the key to the gateway device; and
    establishing a private SSID-based connection between the gateway device and the terminal device, when authentication performed by the gateway device on the received private SSID and key succeeds.

2. The method according to claim 1, further comprising:
    sending, by the terminal device, the private SSID and the key when the terminal device detects that (i) the terminal device and the gateway device meet a second connection condition and (ii) it is not the first time the terminal device is to be connected to the gateway device; and
    establishing a private SSID-based connection between the gateway device and the terminal device, when authentication performed by the gateway device on the received private SSID and key succeeds.

3. A method for connecting a terminal device to a gateway device, the method comprising:
    acquiring, by the terminal device, from the gateway device, a first common service set identifier (SSID) preset in the gateway device, in response to the terminal device detecting that (i) the terminal device and the gateway device meet a first connection condition and (ii) it is the first time the terminal device is to be connected to the gateway device;
    sending, by the terminal device, a second common SSID preset in the terminal device to the gateway device after authentication performed on the acquired first common SSID succeeds;
    establishing a common SSID-based connection between the terminal device and the gateway device, when authentication performed by the gateway device on the second common SSID succeeds;
    receiving and storing, by the terminal device, a private SSID and a key of the gateway device that are sent by the gateway device, wherein the private SSID and the key are sent after the authentication performed by the gateway device on the second common SSID succeeds;
    disconnecting, by the terminal device, the common SSID-based connection between the terminal device and the gateway device; and
    sending, by the terminal device to the gateway device, the private SSID and the key of the gateway device, the private SSID and the key enabling the gateway device to perform authentication on the private SSID and the key, wherein when the authentication succeeds, a private SSID-based connection is established between the terminal device and the gateway device.

4. The method according to claim 3, wherein the terminal device detecting that the terminal device and the gateway device meet the first connection condition comprises:
    detecting, by the terminal device, that a physical cable between the terminal device and the gateway device has been connected.

5. The method according to claim 3, wherein the terminal device detecting that the terminal device and the gateway device meet the first connection condition comprises:
    detecting, by the terminal device, that a strength of a radio signal between the terminal device and the gateway device satisfies a preset strength threshold.

6. The method according to claim 3, further comprising:
    acquiring, by the terminal device, the private SSID and the key of the gateway device, in response to the terminal device detecting that (i) the terminal device and the gateway device meet a second connection condition and (ii) it is not the first time the terminal device is to be connected to the gateway device.

7. The method according to claim 6, wherein the terminal device detecting that the terminal device and the gateway device meet the second connection condition comprises:
    detecting, by the terminal device, that a physical cable between the terminal device and the gateway device has been connected.

8. The method according to claim 6, wherein the terminal device detecting that the terminal device and the gateway device meet the second connection condition comprises:
    detecting, by the terminal device, a radio signal from the gateway device.

9. A terminal device, comprising:
    a memory configured for storing instructions; and
    a processor coupled to the memory, wherein the processor is configured, when executing the instructions to:
        acquire from a gateway device, a first common service set identifier (SSID) preset in the gateway device, in response to a detection that (i) the terminal device and the gateway device meet a first connection condition and (ii) it is the first time the terminal device is to be connected to the gateway device;

send a second common SSID preset in the terminal device to the gateway device after authentication performed on the acquired first common SSID succeeds;

establish a common SSID-based connection between the terminal device and the gateway device, when authentication performed by the gateway device on the second common SSID succeeds;

receive and store a private SSID and a key of the gateway device that are sent by the gateway device, wherein the private SSID and the key are sent after the authentication performed by the gateway device on the second common SSID succeeds;

disconnect the common SSID-based connection between the terminal device and the gateway device; and send, to the gateway device, the private SSID and the key of the gateway device, the private SSID and the key enabling the gateway device to perform authentication on the private SSID and the key, wherein when the authentication succeeds, a private SSID-based connection is established between the terminal device and the gateway device.

10. The terminal device according to claim 9, wherein the detection that the terminal device and the gateway device meet the first connection condition comprises:

a detection that a physical cable between the terminal device and the gateway device has been connected.

11. The terminal device according to claim 9, wherein the detection that the terminal device and the gateway device meet the first connection condition comprises:

a detection that a strength of a radio signal between the terminal device and the gateway device satisfies a preset strength threshold.

12. The terminal device according to claim 9, wherein the processor is further configured to:

acquire the private SSID and the key of the gateway device, in response to a detection that (i) the terminal device and the gateway device meet a second connection condition and (ii) it is not the first time the terminal device is to be connected to the gateway device.

13. The terminal device according to claim 12, wherein the detection that the terminal device and the gateway device meet the second connection condition comprises:

a detection that a physical cable between the terminal device and the gateway device has been connected.

14. The terminal device according to claim 12, wherein the detection that the terminal device and the gateway device meet the second connection condition comprises:

a detection of a radio signal from the gateway device.

* * * * *